United States Patent
Mishra et al.

(10) Patent No.: US 10,237,088 B2
(45) Date of Patent: Mar. 19, 2019

(54) SYSTEMS AND METHODS FOR AVOIDING INADVERTENT LOOPS IN A LAYER 2 SWITCHED NETWORK

(71) Applicant: Ciena Corporation, Hanover, MD (US)

(72) Inventors: Rajneesh Mishra, Gurgaon (IN); Vikas Trivedi, Gurgaon (IN); Prashant Vashisht, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 192 days.

(21) Appl. No.: 15/356,969

(22) Filed: Nov. 21, 2016

(65) Prior Publication Data
US 2018/0102944 A1    Apr. 12, 2018

(30) Foreign Application Priority Data

Oct. 7, 2016    (IN) .............................. 201611034496

(51) Int. Cl.

| | |
|---|---|
| *H04L 12/24* | (2006.01) |
| *H04L 12/42* | (2006.01) |
| *H04L 12/721* | (2013.01) |
| *H04L 12/26* | (2006.01) |
| *H04L 12/46* | (2006.01) |

(52) U.S. Cl.
CPC .......... *H04L 12/422* (2013.01); *H04L 12/462* (2013.01); *H04L 43/0829* (2013.01); *H04L 45/66* (2013.01)

(58) Field of Classification Search
None
See application file for complete search history.

(56) References Cited

U.S. PATENT DOCUMENTS

| | | | |
|---|---|---|---|
| 9,485,161 B2 | 11/2016 | Chhabra et al. | |
| 2010/0002702 A1* | 1/2010 | Saito ....................... | H04L 45/18 370/392 |
| 2010/0150161 A1 | 6/2010 | Saksena et al. | |

(Continued)

OTHER PUBLICATIONS

IEEE Standard for Local and metropolitan area networks, Virtual Bridged Local Area Networks, Amendment 4: Provider Bridges, IEEE Computer Society, IEEE Std 802.1ad™—2005 (Amendment to IEEE Std 802.1Q™—2005), May 26, 2006, pp. 1-74.

(Continued)

*Primary Examiner* — Phirin Sam
*Assistant Examiner* — Sori A Aga
(74) *Attorney, Agent, or Firm* — Clements Bernard Walker PLLC; Christopher L. Bernard; Lawrence A. Baratta, Jr.

(57) ABSTRACT

Loop prevention systems and methods implemented in a switch to prevent loops in a Layer 2 packet switched network based on Media Access Control (MAC) movement in a forwarding database include enabling class based MAC learning on one or more ports with all of the one or more ports initially in a higher priority learning class; disabling MAC movements from the higher priority learning class to a lower priority learning class and disabling MAC movements in the lower priority learning class such that the switch discards frames attempting to perform MAC movement to ports which are in the lower priority learning class; and managing a priority for specific Source MAC addresses between a source port belonging to the higher priority learning class and the lower priority learning class based on detected loops for the specific Source MAC addresses.

17 Claims, 9 Drawing Sheets

(56) References Cited

U.S. PATENT DOCUMENTS

| | | | |
|---|---|---|---|
| 2013/0163596 A1* | 6/2013 | Zhang | ............ H04L 45/18 370/392 |
| 2014/0071825 A1 | 3/2014 | Chhabra et al. | |
| 2014/0247829 A1 | 9/2014 | Gautam et al. | |
| 2016/0028602 A1 | 1/2016 | Mishra et al. | |

OTHER PUBLICATIONS

ITU-T, Telecommunication Standardization Sector of ITU, G.8032/Y.1344, Ethernet ring protection switching, Aug. 2015, pp. 1-82.

\* cited by examiner

- AFTER THE ACTION APPLIED IN FIG. 5, LOOPED BACK FRAMES WOULD GET DROPPED ON ONE OF S1 TO S6 SWITCHES DEPENDING ON WHERE MAC MOVEMENT IS HAPPENING. ASSUME IT TO BE P1 OF SWITCH S1 HERE IN THIS EXAMPLE. AS PROBLEMATIC FRAMES ARE GETTING DROPPED AT INGRESS, LOOPING WOULD END.
- THEREAFTER THE PROCESS WOULD REMOVE ACTION FROM PORTS WHICH ARE NOT RECEIVING LOOPED BACK FRAMES.
- SEND DOWN MEP CCMS FOR PROBLEMATIC SERVICE ON P2 AND P3. AS SYSTEM WOULD RECEIVE SELF-GENERATED CCMS BECAUSE OF PROVIDER NETWORK LOOP. SYSTEM WOULD RESTORE PORT P1 TO HIGHER PRIORITY LEARNING CLASS.
- ON THE BASIS OF LOOP NOTIFICATIONS AND DIRECTION OF THE LOOP, CENTRALIZED NMS SYSTEMS CAN DIAGNOSE THE PROVIDER NETWORK AND ISOLATE THE ROOT CAUSE OF THE LOOP.

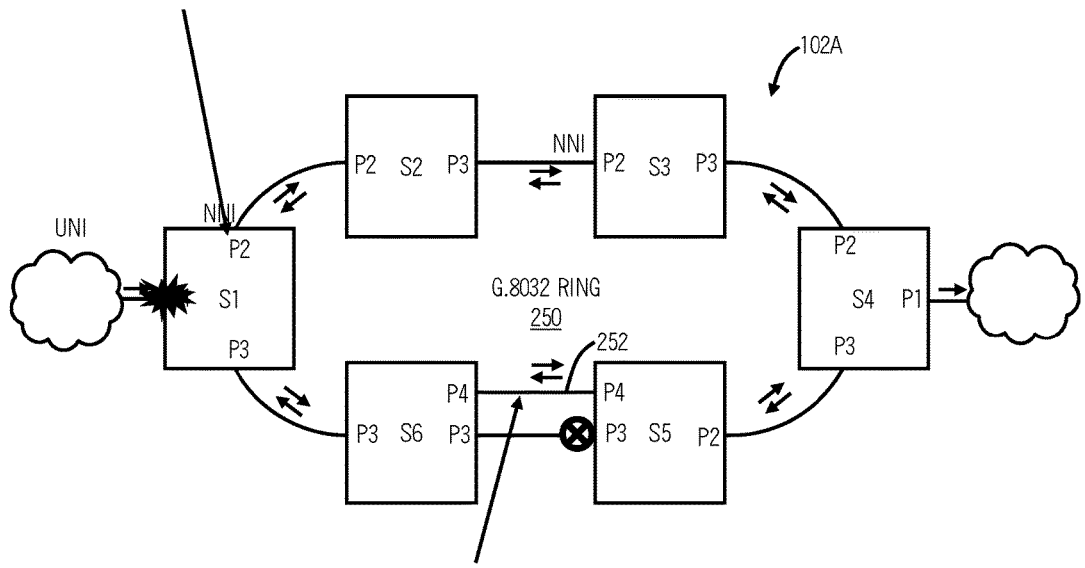

EXTRA LINK BETWEEN NODES S6 AND S5 GOT ADDED INTO SERVICE ACCIDENTLY, CAUSING NETWORK LOOP.

⊗ BLOCKING PORT

⇌ DOWN MEP CCMs FOR PROBLEMATIC SERVICE

FIG. 6

- ONCE ROOT CAUSE IS ISOLATED AND FIXED, FLUSH THE SERVICE'S MAC TABLE ON ALL THE NODES CARRYING THIS SERVICE AND SERVICE CAN RESUME NORMALLY EVEN WHEN LOOP-PREVENTING ACTION IS ON.
- REVERSION LOGIC WOULD SEE THAT NOW THERE IS NO CLASS BASED MAC MOVEMENT TRIGGERED DROPS ON THE I-NNI PORTS AND IT WOULD RESTORE ALL PORTS BACK TO NORMAL HIGHER PRIORITY LEARNING CLASS

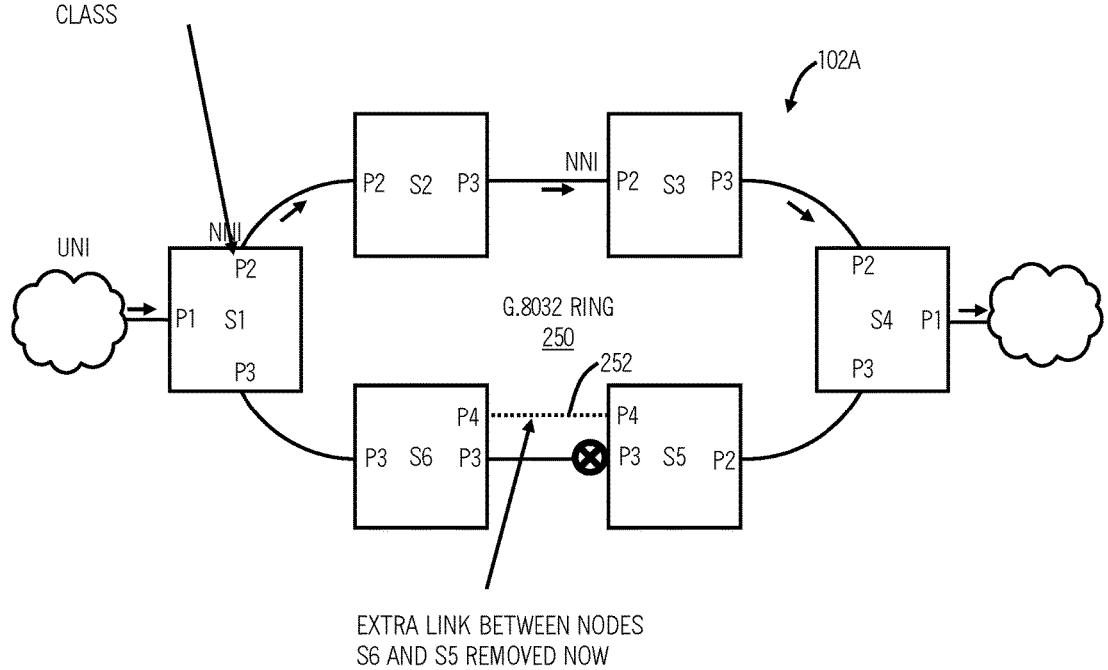

EXTRA LINK BETWEEN NODES
S6 AND S5 REMOVED NOW

⊗ BLOCKING PORT

FIG. 7

SYSTEMS AND METHODS FOR AVOIDING INADVERTENT LOOPS IN A LAYER 2 SWITCHED NETWORK

CROSS-REFERENCE TO RELATED APPLICATION(S)

The present patent application/patent claims the benefit of priority of Indian Patent Application No. 201611034496, filed on Oct. 7, 2016, and entitled "SYSTEMS AND METHODS FOR AVOIDING INADVERTENT LOOPS IN A LAYER 2 SWITCHED NETWORK," the contents of which are incorporated in full by reference herein.

FIELD OF THE DISCLOSURE

The present disclosure generally relates to networking systems and methods. More particularly, the present disclosure relates to systems and methods for avoiding inadvertent loops in a Layer 2 switched network.

BACKGROUND OF THE DISCLOSURE

In Layer 2 switched networks, network administrators are well aware of the downside of network loops and therefore are extremely cautious in provisioning loop prevention techniques. Some example loop prevention techniques include ITU-T Recommendation G.8032/Y.1344 (08/15) "Ethernet Ring Protection Switching," IEEE 802.1ad Spanning Tree Protocol (xSTP may generically refer to a Spanning Tree Protocol, including any one of standard Spanning Tree Protocol (STP), Rapid Spanning Tree Protocol (RSTP), Multiple Spanning Tree Protocol (MSTP), or variations thereof), etc. Despite the use of loop prevention techniques, inadvertent loops may still form due to network runtime changes such as for debugging or scaling reasons; customer network loops sometimes create unintentional loops, etc. There are existing techniques to detect loops that occur in connected customer networks, and, once detected, these techniques report an alarm and/or block the specific service from entering the network, or, in worst cases, simply force down the customer port where the specific service is entering the network. However, there is no known mechanism and action which consistently works to safeguard a provider network from its own as well as customer network loops.

Known loop prevention actions configured by service providers primarily address issues caused by customer network loops by applying certain actions on User-Network Interface (UNI) ports. A "Port shutdown" (i.e., force operational down) action can be applied on UNIs only and would disrupt all traffic on that UNI. Service based actions such as an STP block needs to be enabled per service. The service, on which this action is applied, will drop all frames of the problematic service (even if the problem is limited to certain flows such as Source Media Access Control (MAC) addresses). Additionally, with this action enable, a user cannot determine whether the loop condition has been resolved. This capability is extremely important if customer network loops are transient and correct within a short duration.

BRIEF SUMMARY OF THE DISCLOSURE

In an exemplary embodiment, a loop prevention method implemented in a switch to prevent loops in a packet switched network based on Media Access Control (MAC) movement in a forwarding database includes enabling class based MAC learning on one or more ports with all of the one or more ports initially in a higher priority learning class; disabling MAC movements from ports belonging to the higher priority learning class to ports belonging to a lower priority learning class and disabling MAC movements in the lower priority learning class such that the switch discards frames attempting to perform MAC movement to ports which are in the lower priority learning class; and managing a priority for specific Source MAC addresses between a source port belonging to the higher priority learning class and the lower priority learning class based on detected loops for the specific Source MAC addresses. The managing can include moving source ports of a specific source MAC address to the lower priority learning class responsive to detection of a loop, moving a trusted source port of the specific MAC address back to the higher priority learning class responsive to determination of direction of the loop, and moving the source ports which have incorrectly learnt specific source MAC address back to the higher priority learning class responsive to resolution of the loop.

The loops can be detected based on MAC toggling of a Source MAC address where the Source MAC address has continuous movement across two or more ports of the switch over a detection window. The loop prevention method can operate concurrently with a second loop prevention technique including one of G.8032, Spanning Tree Protocol (STP) variants, and split horizon. The loop prevention method can further include, responsive to detection of a loop, determining a direction of the loop based on which ports associated with the loop have MAC movement. The loop prevention method can further include, responsive to a loop including both User-Network Interface (UNI) ports and Network-Network Interface (NNI) ports at the switch, determining whether the loop is caused by a provider network or a customer network by transmitting Down Maintenance Entity Point (MEP) Continuity Check Messages (CCMs). The loop prevention method can further include moving the UNI ports back to the higher priority learning class responsive to the loop being in the provider network; and moving the NNI ports back to the higher priority learning class responsive to the loop not being in the provider network. The managing can include monitoring count of discards due to MAC movements to monitor a status of the detected loops.

In another exemplary embodiment, a loop prevention apparatus, in a switch, adapted to prevent loops in a packet switched network based on Media Access Control (MAC) movement in a forwarding database includes circuitry adapted to enable class based MAC learning on one or more ports with all of the one or more ports initially in a higher priority learning class; circuitry adapted to disable MAC movements from ports belonging to the higher priority learning class to ports belonging to a lower priority learning class and disabling MAC movements in the lower priority learning class such that the switch discards frames attempting to perform MAC movement to ports which are in the lower priority learning class; and circuitry adapted to manage a priority for specific Source MAC addresses between a source port belonging to the higher priority learning class and the lower priority learning class based on detected loops for the specific Source MAC addresses. The circuitry adapted to manage can be adapted to move source ports of a specific source MAC address to the lower priority learning class responsive to detection of a loop, to move a trusted source port of the specific MAC address back to the higher priority learning class responsive to determination of direction of the loop, and to move the source ports which have incorrectly learnt specific source MAC address back to the back to the higher priority learning class responsive to resolution of the loop.

The loops can be detected based on MAC toggling of a Source MAC address where the Source MAC address has continuous movement across two or more ports of the switch over a detection window. The loop prevention apparatus can further include circuitry adapted to operate a second loop prevention technique including one of G.8032, Spanning Tree Protocol (STP) variants, and split horizon concurrently with the loop prevention apparatus. The loop prevention apparatus can further include circuitry adapted to determine a direction of the loop based on which ports associated with the loop have MAC movement responsive to detection of a loop. The loop prevention apparatus can further include circuitry adapted to determine whether the loop is caused by a provider network or a customer network by transmitting Down Maintenance Entity Point (MEP) Continuity Check Messages (CCMs) responsive to a loop including both User-Network Interface (UNI) ports and Network-Network Interface (NNI) ports at the switch.

In a further exemplary embodiment, a switch adapted to prevent loops in a packet switched network based on Media Access Control (MAC) movement in a forwarding database includes a plurality of ports adapted for packet switching between one another; and a controller adapted to enable class based MAC learning on one or more ports with all of the one or more ports initially in a higher priority learning class, disable MAC movements from ports belonging to the higher priority learning class to ports belonging to a lower priority learning class and disabling MAC movements in the lower priority learning class such that the switch discards frames attempting to perform MAC movement to ports which are in the lower priority learning class, and manage a priority for specific Source MAC addresses between a source port belonging to the higher priority learning class and the lower priority learning class based on detected loops for the specific Source MAC addresses. The controller can be adapted to move source ports of a specific source MAC address to the lower priority learning class responsive to detection of a loop, to move a trusted source port of the specific MAC address back to the higher priority learning class responsive to determination of direction of the loop, and to move the source ports which have incorrectly learnt specific source MAC address back to the higher.

The loops can be detected based on MAC toggling of a Source MAC address where the Source MAC address has continuous movement across two or more ports of the switch over a detection window. The controller can be adapted to operate a second loop prevention technique including one of G.8032, Spanning Tree Protocol (STP) variants, and split horizon concurrently with the loop prevention apparatus. The controller can be adapted to determine a direction of the loop based on which ports associated with the loop have MAC movement responsive to detection of a loop. The controller can be further adapted to determine whether the loop is caused by a provider network or a customer network by transmitting Down Maintenance Entity Point (MEP) Continuity Check Messages (CCMs) responsive to a loop including both User-Network Interface (UNI) ports and Network-Network Interface (NNI) ports at the switch.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 4-7 are network diagrams of an exemplary operation of the loop prevention process of FIG. 3 in a provider network with six switches in a G.8032 ring;

DETAILED DESCRIPTION OF THE DISCLOSURE

Figure 1:
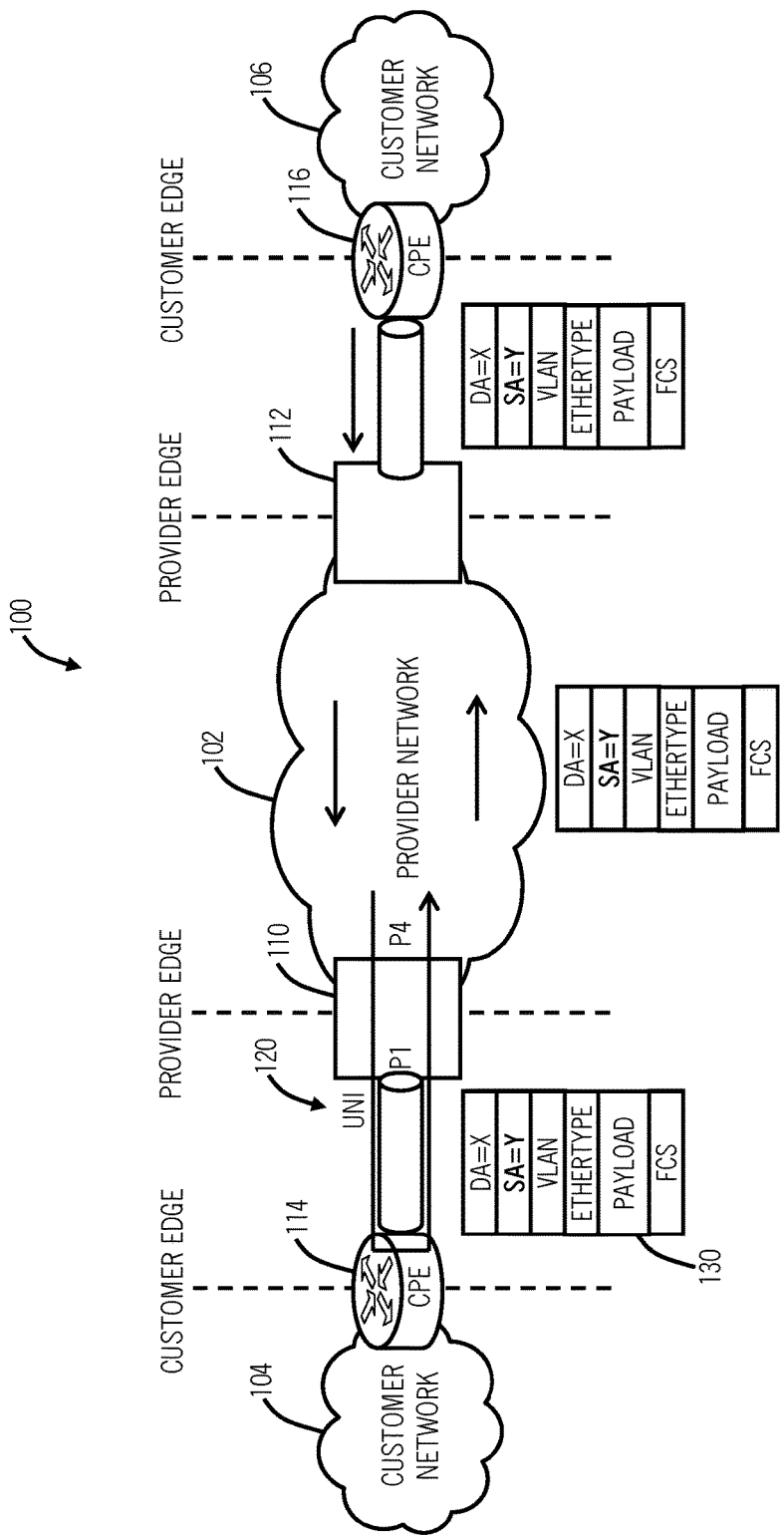
FIG. 1 is a network diagram of a network with a provider network connected to two customer networks detailing an exemplary loop caused by the customer network.

Again, in various exemplary embodiments, the present disclosure relates to systems and methods for avoiding inadvertent loops in a Layer 2 switched network. The systems and methods provide a loop prevention technique which is flow specific, i.e., it does not affect an entire port with other flows. If within a given service (e.g., a Virtual Local Area Network (VLAN)), only part of the traffic is participating in a loop, the systems and methods would apply to the problematic flow, not the entire service. Once applied to a port, loop prevention techniques associated with the systems and methods consistently work on all services participating in the network loop. If new services start looping, the loop prevention techniques automatically prevent their loops. Good services run uninterrupted with the loop prevention techniques. The loop prevention techniques can automatically detect loops and allow the use of a centralized system, such as a Network Management System (NMS), to trace a network path for debugging.

Specifically, the systems and methods discard problematic flows selectively if network loops are found in a Layer 2, packet switched network. The systems and methods are not a substitute or replacement for existing, well-known loop prevention techniques such as G.8032, xSTP, split horizon, etc. Instead, the systems and methods work above these loop prevention techniques, and, if loop conditions occur such as due to inadvertent network connections and/or network misconfigurations, the systems and methods start dropping problematic flows to avoid network degradation or a shutdown of the network. The problematic flows are identified by Source MAC address of frames which are looping. The systems and methods have better control in comparison to service-based actions (e.g., VLAN). The loop prevention technique of the systems and methods is based on class-based Source MAC learning functionality.

Typically, Layer 2 MAC learning is flat and MAC movement can happen from one port to any other port of a switch. Class-based MAC learning is an improvement which allows MAC movement to be restricted as per requirement. To support this, the Layer 2 switch supports more than one learning class and each port on the switch is mapped to a class and each class is assigned a priority. During normal MAC learning, the learning class does not matter and MACs are learnt against a source port. However, class-based Source MAC learning is utilized in the case of MAC movement. When an incoming frame attempts to perform a MAC movement, (to determine whether MAC movement is allowed) the priority of the incoming port is compared to the priority of the source port which is already learnt against that MAC. If the priority of the new incoming port is higher than existing source port, MAC movement is allowed; otherwise, it is based on user configuration which says whether to allow MAC movement from lower priority to higher priority port or not. Similarly, a user can also configure whether switch should allow station movement within ports of a single class or not.

Network Loop Examples

Referring to FIG. 1, in an exemplary embodiment, a network diagram illustrates a network 100 with a provider network 102 connected to two customer networks 104, 106 detailing an exemplary loop caused by the customer network 104. The provider network 102 includes switches 110, 112 at the provider edge and the customer networks 104, 106 include Customer Premises Equipment (CPE) switches 114, 116 at the customer edge. The switch 110 interfaces the switch 114 and the switch 112 interfaces the switch 116. For illustration purposes, additional details of the networks 102, 104, 106 are omitted. The network 100 is presented to illustrate a customer network loop causing a provider 4 customer 4 provider network flow based loop. In this example, a frame 130 is shown with a Destination Address (DA) of X, a Source Address (SA) of Y, a specific VLAN, Ethertype, Payload, and Frame Check Sequence (FCS), and there is a customer network loop in the customer network 104.

Customer network loop can happen at an UNI demarcation point 120 or within the network 104. Such loops inject undesired Layer 2 Broadcast, Unknown unicast, and Multicast (BUM) traffic into the provider network 102; potentially degrading the network 102. If the customer network 104 has a loop within the network, then there is a possibility that certain flows (i.e., MACs) within a single service (i.e., VLAN), such as the frame 130, are problematic while other flows are good and successfully established a session with their remote peer.

Figure 2:
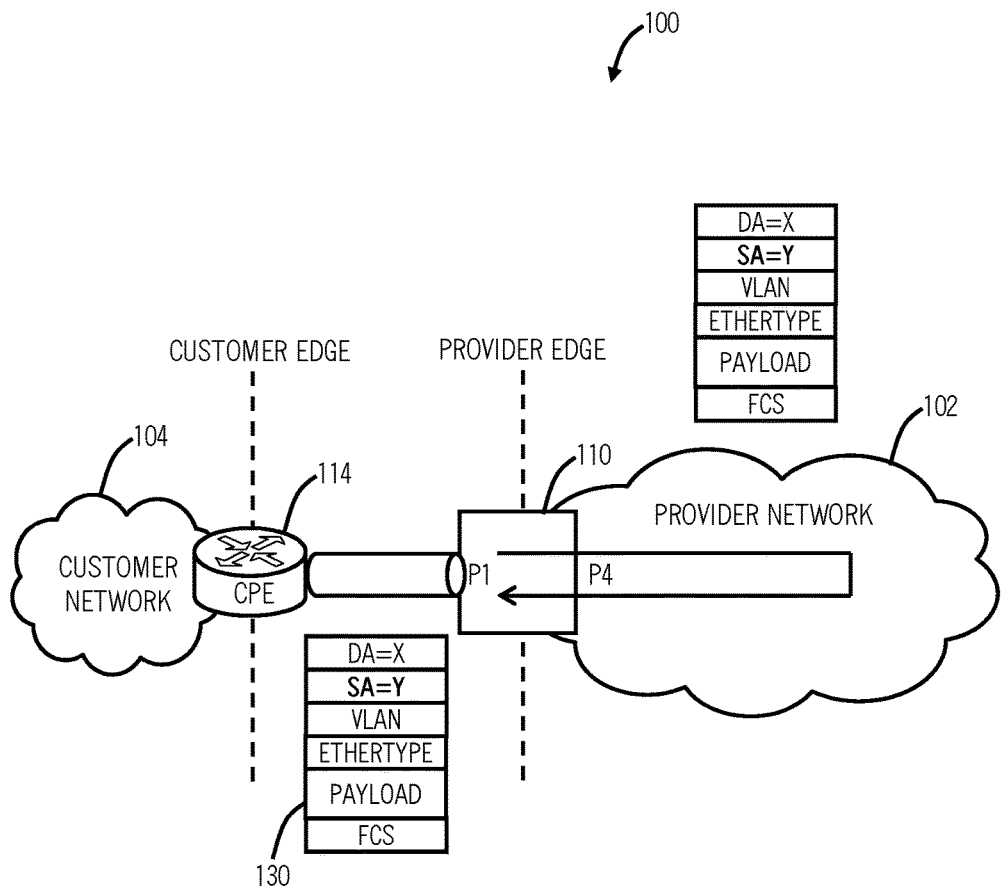
FIG. 2 is a network diagram of the network of FIG. 1 with the provider network connected to the customer network detailing an exemplary loop in the provider network.

Referring to FIG. 2, in an exemplary embodiment, a network diagram illustrates the network 100 with the provider network 102 connected to the customer network 104 detailing an exemplary loop in the provider network 102. In this example, the loop for the frame 130 is in the provider network 102. For example, network loops can be caused by Provider network misconfigurations causing customer 4 provider 4 customer network flow based loops. Such loops can potentially bring down the entire network 102.

There is the possibility of network degradations because of inadvertent network loops. Unintentional loops may happen because of, for example, wrong fiber connections; failure to add services into G.8032 virtual channels; unintended PHY/MAC loopbacks; and the like. The systems and methods described herein are extremely useful in this case as it has the capability to drop problematic flows only and keep other good flows unaffected.

Loop Prevention Process

Figure 3:
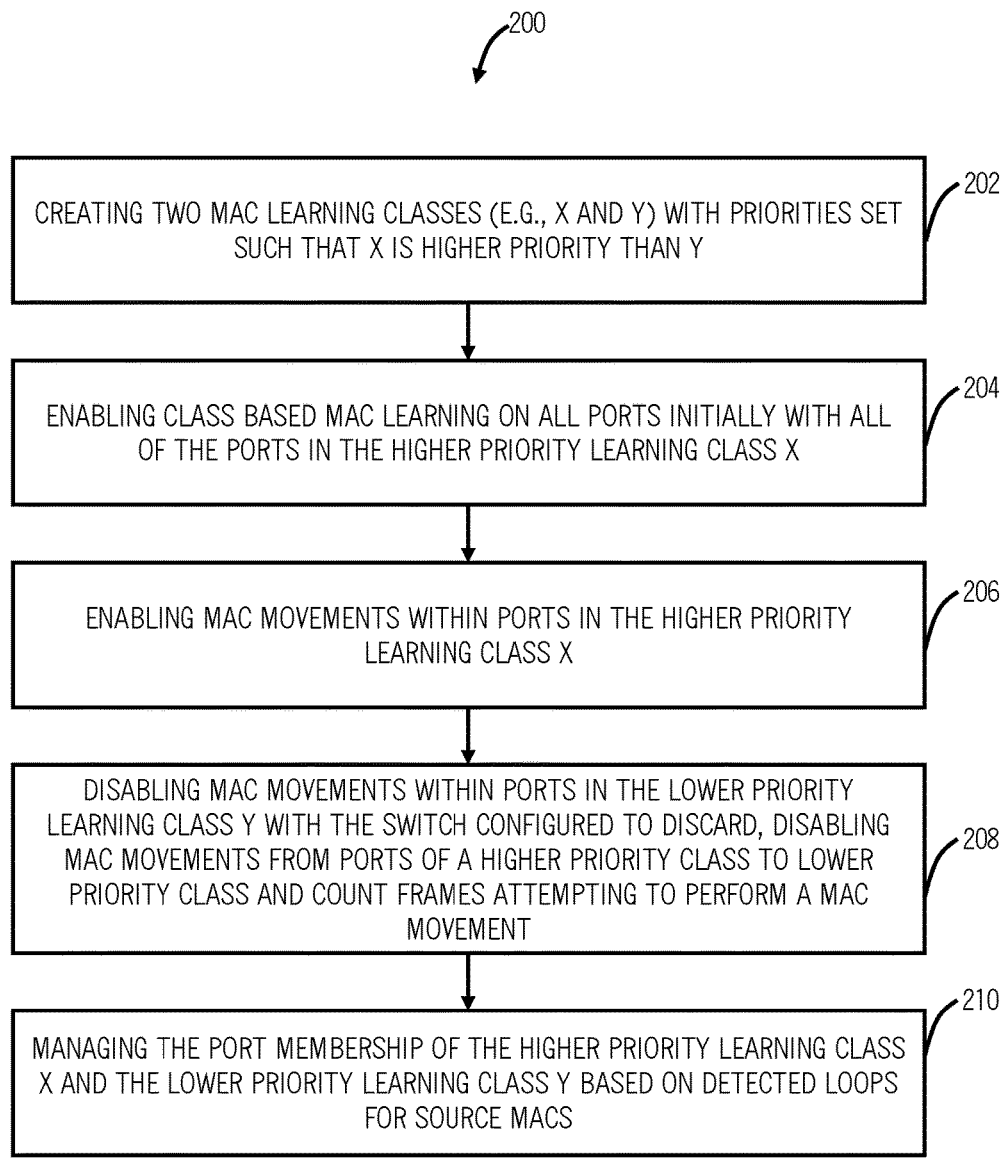
FIG. 3 is a flowchart of a loop prevention process.

Referring to FIG. 3, in an exemplary embodiment, a flowchart illustrates a loop prevention process 200. Again, in an Ethernet Layer 2 switched network, traffic loops may occur because of inadvertent network connections and/or misconfiguration of loop prevention techniques (e.g., xSTP, G.8032 or split horizon). Network loops are always a threat to network stability. Though network administrators strive hard to configure loop prevention techniques carefully in the network 100, there is always a possibility of errors. Additionally, administrators cannot blindly trust connected neighboring networks, such as the networks 104, 106, and assume them to be loop free.

The loop prevention process 200 discards problematic flows selectively if network loops are found in a Layer 2 switched network. Again, the loop prevention process 200 is not a substitute for well-known loop prevention techniques; instead it works above such standard protocols, and, if loop conditions caused by inadvertent network connections and/or network misconfigurations are found, the loop prevention process 200 starts dropping problematic flows to avoid network degradation or complete shutdown of the network. Problematic flows are identified by the Source MAC of the frames which are looping. Therefore, the loop prevention process 200 has better control in comparison to service (i.e. VLAN) based actions.

The loop prevention process 200 is based on class based Source MAC learning functionality and has the following prerequisites. First, the switches 110, 112 are capable of performing MAC learning and identifying MAC movements (i.e., source port changes on a learnt MAC entry). The data path (hardware and/or software-based) supports class based MAC learning. MAC learning classes are associated with a priority. MAC movement within the same learning class can be allowed or disallowed. If MAC movement is disallowed, frames causing movement within same learning class ports can be dropped at an ingress port and counted. Frames causing MAC movement from a lower priority class to higher priority class can be dropped at an ingress port and counted.

A MAC learning class contains one or more physical or aggregation ports and is associated with a priority. Ports included in that MAC learning class inherit its priority. MAC movements within the ports belonging to same learning class is configurable and can be allowed or disallowed. If MAC movement is disallowed, frames causing movement within same learning class ports can be dropped at an ingress port and counted. Additionally, frames causing MAC movement from a port belonging to lower priority class to a port belonging to higher priority class can be dropped at the ingress port and counted. For example, if a source MAC X is learnt on port 1 with higher priority class A and the same MAC X is incoming on port 2 with lower priority class B then re-learning (MAC movement from port 1 to port 2) of MAC X on port 2 will not be allowed and MAC X frame will be dropped at ingress port 2.

The loop prevention process 200 can operate with any loop detection technique. With the prerequisites above, the loop prevention process 200 uses class based Source MAC learning of a data path. The loop prevention process 200 is enabled and operated on one or more of the switches 110, 112 in the provider network 102.

The loop prevention process 200 includes creating two MAC learning classes (e.g., X and Y) with priorities set such that X is higher priority than Y (step 202), enabling class based MAC learning on all ports initially with all of the ports in the higher priority learning class X (step 204), enabling MAC movements within ports in the higher priority learning class X (step 206), disabling MAC movements within ports in the lower priority learning class Y with the switch configured to discard, disabling MAC movements from ports of a higher priority class to lower priority class and count frames attempting to perform a MAC movement (step 208), and managing the port membership of the higher priority learning class X and the lower priority learning class Y based on detected loops for Source MACs (step 210).

The loop prevention action in the loop prevention process 200 works on the fact that "if there is a network loop in an L2 switched network, network elements participating in the loop shall observe source port toggling on the Source MACs of problematic flows. For such MACs, there shall be a trusted port which is the correct destination port to reach that address, and one or more than one spurious ports (mentioned as problematic ports elsewhere in this document) learning these MACs because of loop condition."

When the loop is found using any loop detection technique, the loop prevention process 200 moves the problematic (or untrusted) port(s) (i.e., the problematic or untrusted ports are receiving the looped back frames) into a lower priority MAC learning class. As logic would not allow MAC movements from higher priority learning class to lower priority learning class as well as within ports belonging to lower priority class and drop such frames, all frames belonging to network loops and ingressing on problematic ports will be dropped terminating the loops.

The loop prevention process 200 has following benefits. First, the loop prevention process 200 discards only those frames which are looping in the network. It does not affect other frames. If the looping condition is resolved, traffic can pass uninterrupted even when the discard action is on in the loop prevention process 200. Second, the loop prevention process 200 allows a user to determine if the loop condition has been resolved, in a live network without affecting running services. The loop prevention process 200 can work in both cases: for loops occurring in the provider network 102 and for loops occurring in the customer networks 104, 106.

The loop prevention process 200 operates on reception only. However, as this action intends to avoid network degradation caused by inadvertent loops and is run over standard protocols (xSTP, G.8032, etc.) based networks, discarding looping frames at ingress is enough to achieve its purpose.

The loop prevention process 200 contemplates using any technique for detecting a network loop. There are several known techniques to determine network loops such as, for example, using a control protocol (e.g., Connectivity Fault Management (CFM)), detection of flapping of learnt MAC addresses, etc. CFM is described in IEEE 802.1ag and uses Continuity Check Messages (CCMs) to monitor services (e.g., for faults, loops, etc.). As IEEE 802.1ag CCM based loop detection is service dependent, it would be more efficient to use MAC toggling (flapping) based loop detection which can work if MAC learning is enabled for the services (which it is in the loop prevention process 200). MAC toggling or flapping detects continuous MAC movements across two or more ports over a detection window which indicates a loop.

In order to apply the proposed loop prevention actions in the loop prevention process 200, it is good to determine the correct direction of flow. If the network 102 is managed by centralized NMS systems, they can easily trace the loop path on the basis of MAC movement notifications and direction of the loop. In order to determine the direction of the flow, one typical way is to record the source port on which a MAC has been learnt for the first time. However, keeping this information accurately is not an easy task because there is always a possibility of valid station movement. Therefore, in an exemplary embodiment, the loop prevention process 200 can use Down Maintenance End Point (MEP) CCMs (which are detailed in IEEE 802.1ag Connectivity Fault Management, the contents of which are incorporated by reference) to determine whether the loop is happening in the network 102.

Once it is determined that there is a loop in the network 102 because of MAC toggling, the loop prevention process 200 performs the following for the managing step 210 for dropping frames participating in the loop to avoid network degradation. First, the managing step 210 includes preventing the loop by moving all ports belonging to the problematic service to the lower priority learning class Y. As movement within the lower priority learning class Y is disallowed, frames attempting to do MAC movements would be discarded; the loop would be closed by this discard action.

Second, the managing step 210 can include determining the direction. Specifically, the loop prevention process 200 can determine all the ports which are participating in the loop, on the basis of ports where a given MAC(s) is(are) moving. Also, if both UNI and Network-Network Interface (NNI) ports are participating in the loop, the loop prevention process 200 determine whether it is caused by the provider network 102 or the customer network 104, 106. Specifically, the loop prevention process 200 can include transmitting Down MEP CCM on network-facing ports which are part of the problematic service. If the switch 110, 112 receives self-generated CCMs, it would indicate the presence of the loop in the provider network 102. Down MEP CCMs should be running at provider network's Maintenance Domain (MD) level and it is expected that provider network would have a guard to prevent leaking of its MD level CCMs outside of its network.

Third, the managing step 210 can include restoring trusted ports back to the higher priority learning class X once the direction of the loop is known. If the loop is in the provider network 102, the UNI ports (facing the customer network 104, 106) can be moved back to the higher priority learning class X. Also, the MAC table can be flushed for the problematic service. Once this is done, frames which potentially create the loop get dropped on one of the Internal-NNI (I-NNI) ports in the provider network 102.

Conversely, if the loop is not in the provider network 102, e.g., in one of the customer networks 104, 106, the NNI ports (in the provider network 102) can be moved back to the higher priority learning class X. Again, the MAC table can be flushed for the problematic service. Once this is done, frames which were part of the loop get dropped on the UNI ports itself in this case of a connected customer network loop avoiding degradation in the provider network 102.

Fourth, the managing step 210 can include determining the loop status, e.g., periodically or at user request. In the case of a connected customer network loop, the class based MAC movement triggered discards can be observed on the subscriber facing port which has(have) been moved to lower priority learning class. In the case of a provider network loop, the class based MAC movement triggered discards can be observed on I-NNIs of all the switches 110, 112 participating in the service.

Fifth, the managing step 210 can include reversion, namely removing the discard action if the network is loop-free after determining the loop status is clear. If class based MAC movement triggered discards are not occurring, then the network has become loop free. In the case that the loop was in the provider network 102, it is mandatory to flush the MAC table of problematic service after looping condition has been resolved by the administrator. This is not required if the loop was there in connected customer network 104, 106. Once the loop condition has been resolved, then the discard action can be removed, and the port can be restored to the original higher priority learning class X. This can be done in a staggered manner as well.

Exemplary Operation of the Loop Prevention Process

Figure 4:
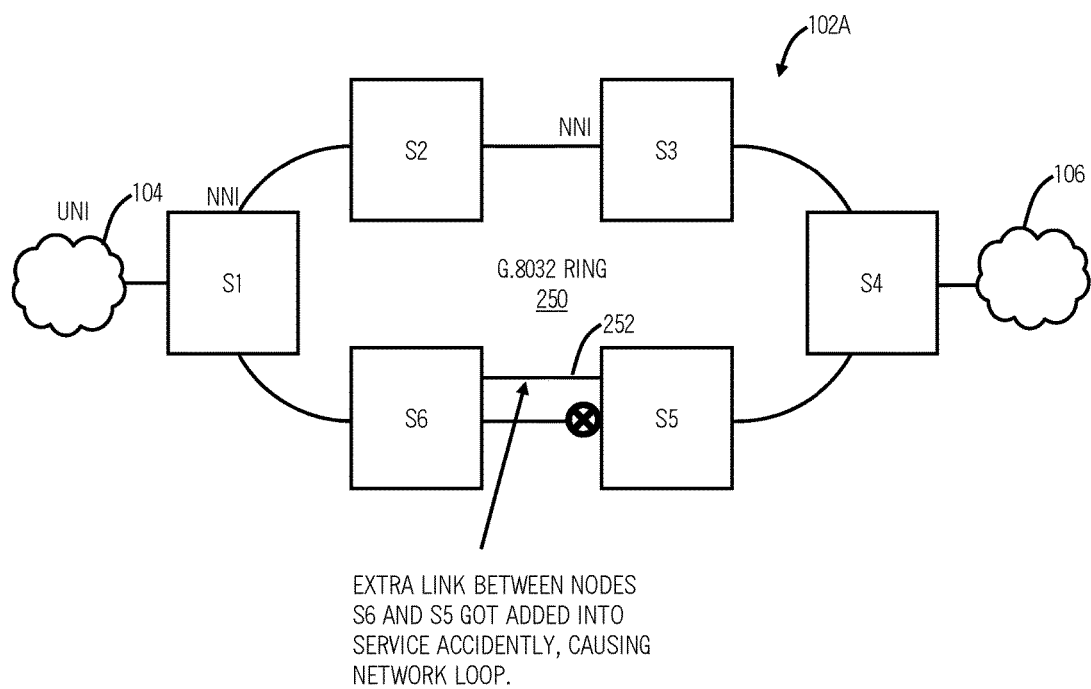
Figure 5:
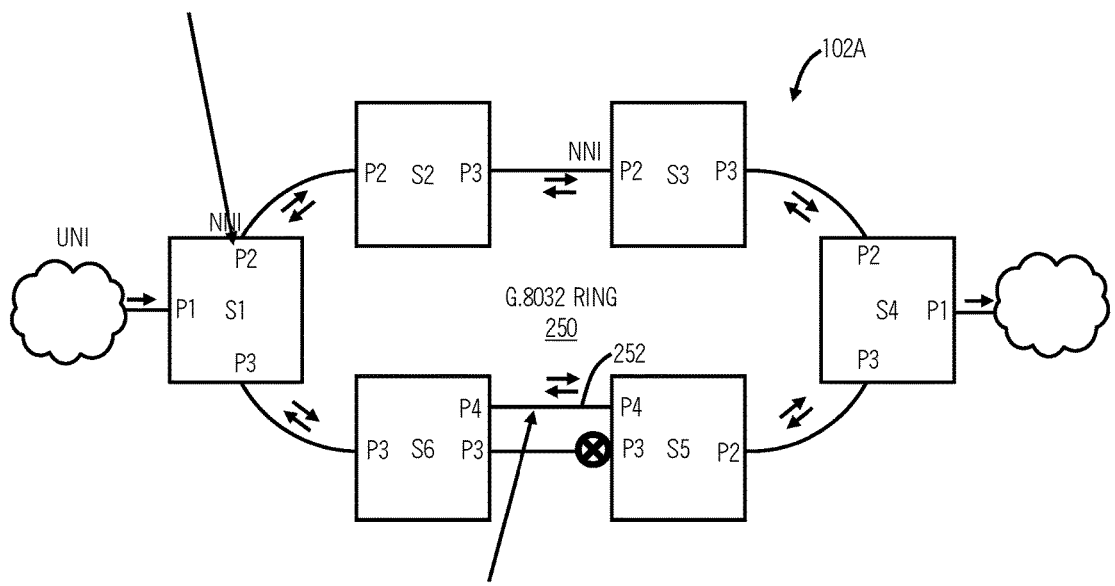
Figure 8:
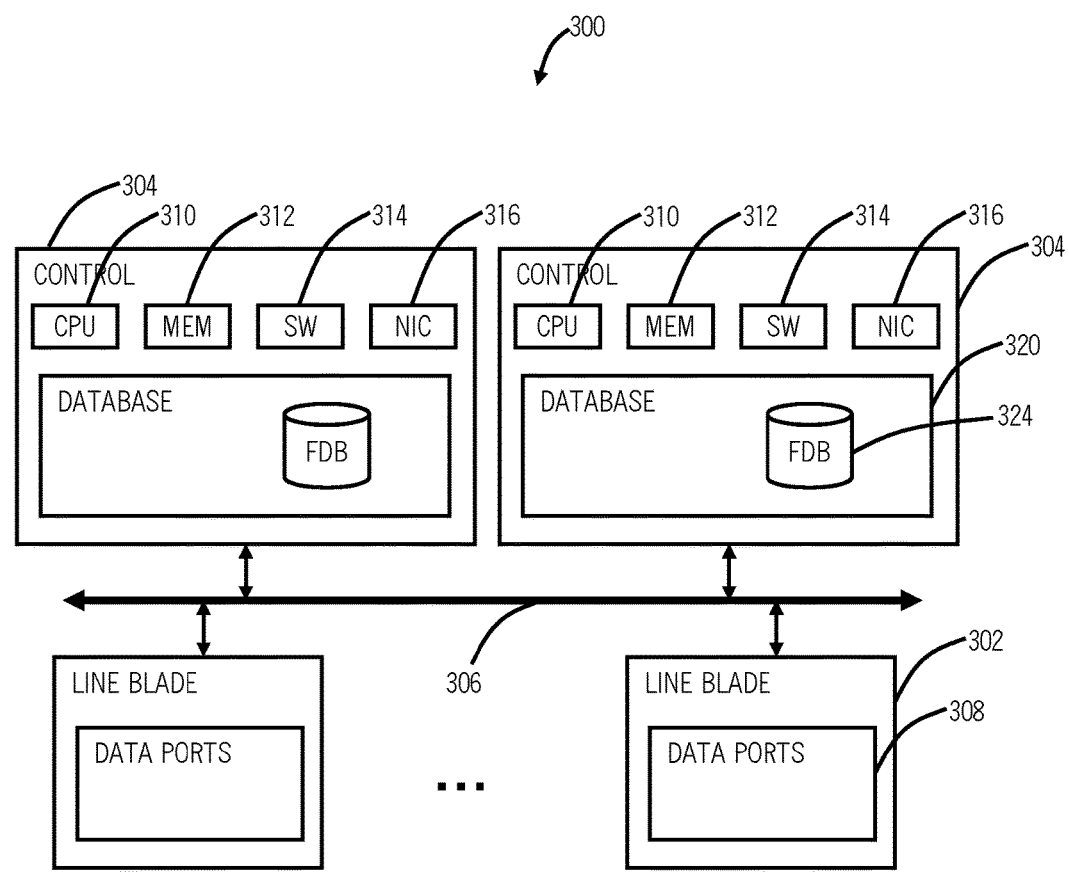
FIG. 8 is a block diagram of an exemplary implementation of a network element.

Referring to FIGS. 4-7, in an exemplary embodiment, network diagrams illustrate an exemplary operation of the loop prevention process 200 in a provider network 102A with six switches S1, S2, S3, S4, S5, S6 in a G.8032 ring 250. FIG. 4 is a network diagram of the G.8032 ring 250 with an extra link 252 inadvertently or accidentally added to the G.8032 ring 250 causing a network loop. Again the extra link 252 can be due to wrong fiber connections, misconfiguration, etc. FIG. 5 is a network diagram of the G.8032 ring 250 with ports (labeled as P1, P2, P3, and/or P4 on each switch) illustrating flows of customer frames with the loop due to the extra link 252. The G.8032 ring 250 has a ring block on port P3 in the switch S5.

At the switch S1, once the loop is determined based on MAC flapping between the ports P1, P2 and P3 on the switch S1, the loop prevention process 200 moves the ports P1, P2, and P3 into the lower priority learning class Y. This means that frames received on the ports P1, P2, and P3 and attempting to perform MAC movement shall be dropped. This way the loop shall be prevented immediately. Similar actions occur on the other switches S2 . . . S6 and their ports P2 and P3 would move into lower priority learning class Y.

FIG. 6 is a network diagram of the G.8032 ring 250 subsequent to the actions taken through the loop prevention process 200 in FIG. 5. After the action in FIG. 5, looped back frames get dropped on one of the switches S1 . . . S6 depending on where MAC movement is happening. Assume it to be the port P1 of the switch S1 here in this example. As problematic frames are getting dropped at ingress, looping would end. Thereafter, the loop prevention process 200 would remove the action from ports which are not receiving looped back frames. The loop prevention process 200 can include sending Down MEP CCMs for problematic the service on P2 and P3. As the switch S1 would receive self-generated CCMs because of the provider network loop, the switch S1 would restore the port P1 to higher priority learning class X. Also, on the basis of loop notifications and the direction of the loop, centralized NMS systems can diagnose the provider network 102 and isolate the root cause of the loop.

FIG. 7 is a network diagram of the G.8032 ring 250 subsequent to removal of the extra link 252. Once the root cause of the loop is isolated and fixed, i.e., removal of the extra link 252, the loop prevention process 200 includes flushing the service's MAC table on all the switches carrying this service and service can resume normally even when the loop prevention action of the loop prevention process 200 is on. Reversion logic would see that now there is no class based MAC movement triggered drops on the I-NNI ports, and it would restore all ports back to normal higher priority learning class X.

Exemplary Network Element

Figure 9:
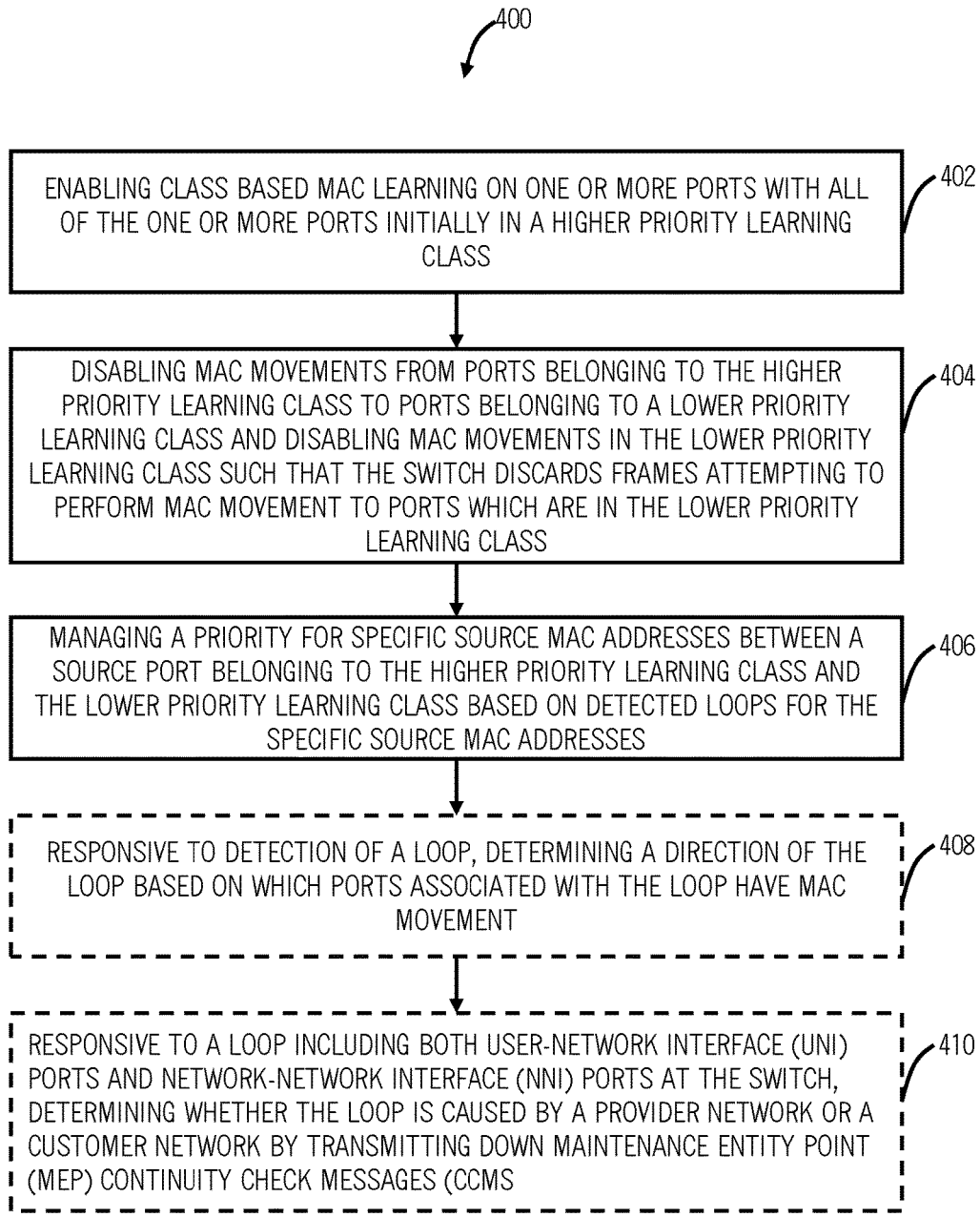
FIG. 9 is a flowchart of a loop prevention process implemented in a switch such as the network element of FIG. 8 to prevent loops in a packet switched network based on Media Access Control (MAC) movement.

Referring to FIG. 9, in an exemplary embodiment, a block diagram illustrates an exemplary implementation of a network element 300. In this exemplary embodiment, the network element 300 is an Ethernet network switch, but those of ordinary skill in the art will recognize the loop prevention process 200 contemplates operation in other types of network elements and other implementations, such as, for example, a layer 2 switch integrated within an optical network element. In an exemplary embodiment, the switches 110, 112, S1, S2, S3, S4, S5, S6 can be implemented as the network element 300.

In this exemplary embodiment, the network element 300 includes a plurality of blades 302, 304 interconnected via an interface 306. The blades 302, 304 are also known as line cards, line modules, circuit packs, pluggable modules, etc. and refer generally to components mounted within a chassis, shelf, etc. of a data switching device, i.e. the network element 300. In another exemplary embodiment, the functionality of each of the blades 302, 304 may be integrated within a single module, such as in the layer 2 switch integrated within an optical network element. Each of the blades 302, 304 may include numerous electronic devices and optical devices mounted on a circuit board along with various interconnects including interfaces to the chassis, shelf, etc.

Two exemplary blades are illustrated with line blades 302 and control blades 304. The line blades 302 generally include data ports 308 such as a plurality of Ethernet ports. For example, the line blade 302 may include a plurality of physical ports disposed on an exterior of the blade 302 for receiving ingress/egress connections. Additionally, the line blades 302 may include switching components to form a switching fabric via the backplane 306 between all of the data ports 308 allowing data traffic to be switched between the data ports 308 on the various line blades 302. The switching fabric is a combination of hardware, software, firmware, etc. that moves data coming into the network element 300 out by the correct port 308 to the next network element. "Switching fabric" includes switching units, or individual boxes, in a node; integrated circuits contained in the switching units; and programming that allows switching paths to be controlled.

Within the context of the loop prevention process 200, the control blades 304 include a microprocessor 310, memory 312, software 314, and a network interface 316 to control packet switching. Specifically, the microprocessor 310, the memory 312, and the software 314 may collectively control, configure, provision, monitor, etc. the network element 300. The network interface 316 may be utilized to communicate with an element manager, an NMS, etc. Additionally, the control blades 304 may include a database 320 that tracks and maintains provisioning, configuration, operational data and the like. The database 320 may include a forwarding database (FDB) 322 and/or a MAC table that is used for MAC learning and flushing in the loop prevention process 200. In this exemplary embodiment, the network element 300 includes two control blades 304 which may operate in a redundant or protected configuration such as 1:1, 1+1, etc.

In general, the control blades 304 maintain dynamic system information including Layer 2 forwarding databases, protocol state machines, and the operational status of the ports 308 within the network element 300. In an exemplary embodiment, the blades 302, 304 are configured to implement a G.8032 ring, such as the ring 250, and to implement the various processes, algorithms, methods, mechanisms, etc. described herein for implementing the loop prevention process 200.

Those of ordinary skill in the art will recognize the network element 300 can include other components which are omitted for illustration purposes, and that the systems and methods described herein are contemplated for use with a plurality of different network elements with the network element 300 presented as an exemplary type of network element. In general, the systems and methods described herein contemplate use with any network element providing packet switching. Furthermore, the network element 300 is merely presented as one exemplary device for the systems and methods described herein.

Loop Prevention Process Implemented in a Switch

Referring to FIG. 9, in an exemplary embodiment, a flowchart illustrates a loop prevention process 400 implemented in a switch such as the network element 300 to prevent loops in a packet switched network based on Media Access Control (MAC) movement. The loop prevention process 400 includes enabling class based MAC learning on one or more ports with all of the one or more ports initially in a higher priority learning class (step 402); disabling MAC movements from ports belonging to the higher priority learning class to ports belonging to a lower priority learning class and disabling MAC movements in the lower priority learning class such that the switch discards frames attempting to perform MAC movement to ports which are in the lower priority learning class (step 404); and managing a priority for specific Source MAC addresses between a source port belonging to the higher priority learning class and the lower priority learning class based on detected loops for the specific Source MAC addresses (step 406).

The managing step 406 can include moving source ports of a specific source MAC address to the lower priority learning class responsive to detection of a loop, moving a trusted source port of the specific MAC address back to the higher priority learning class responsive to determination of direction of the loop, and moving the source ports which have incorrectly learnt specific source MAC address back to the higher. The loops can be detected based on MAC toggling of a Source MAC address where the Source MAC address has continuous movement across two or more ports of the switch over a detection window. The loop prevention process 400 can operate concurrently with a second loop prevention technique including one of G.8032 and Spanning Tree Protocol (STP) variants.

The loop prevention process 400 can further include, responsive to detection of a loop, determining a direction of the loop based on which ports associated with the loop have MAC movement (step 408). The loop prevention process 400 can further include, responsive to a loop including both User-Network Interface (UNI) ports and Network-Network Interface (NNI) ports at the switch, determining whether the loop is caused by a provider network or a customer network by transmitting Down Maintenance Entity Point (MEP) Continuity Check Messages (CCMs) (step 410). The loop prevention process 400 can further include, moving the UNI ports back to the higher priority learning class responsive to the loop being in the provider network; and moving the NNI ports back to the higher priority learning class responsive to the loop not being in the provider network. The managing step 406 can include monitoring count of discards due to MAC movements to monitor a status of the detected loops.

In another exemplary embodiment, a loop prevention apparatus, in a switch, adapted to prevent loops in a Layer 2 packet switched network based on Media Access Control (MAC) movement includes circuitry adapted to enable class based MAC learning on one or more ports with all of the one or more ports initially in a higher priority learning class; circuitry adapted to disable MAC movements from ports belonging to the higher priority learning class to ports belonging to a lower priority learning class and disabling MAC movements in the lower priority learning class such that the switch discards frames attempting to perform MAC movement to ports which are in the lower priority learning class; and circuitry adapted to manage a priority for specific Source MAC addresses between a source port belonging to the higher priority learning class and the lower priority learning class based on detected loops for the specific Source MAC addresses.

In a further exemplary embodiment, a switch adapted to prevent loops in a Layer 2 packet switched network based on Media Access Control (MAC) movement includes a plurality of ports adapted for packet switching between one another; and a controller adapted to enable class based MAC learning on one or more ports with all of the one or more ports initially in a higher priority learning class, disable MAC movements from ports belonging to the higher priority learning class to ports belonging to a lower priority learning class and disabling MAC movements in the lower priority learning class such that the switch discards frames attempting to perform MAC movement to ports which are in the lower priority learning class, and manage a priority for specific Source MAC addresses between a source port belonging to the higher priority learning class and the lower priority learning class based on detected loops for the specific Source MAC addresses.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A loop prevention method implemented in a switch to prevent loops in a packet switched network based on Media Access Control (MAC) movement in a forwarding database, the loop prevention method comprising:
    enabling class based MAC learning on one or more ports with all of the one or more ports initially in a higher priority learning class;
    disabling MAC movements from ports belonging to the higher priority learning class to ports belonging to a lower priority learning class and disabling MAC movements in the lower priority learning class such that the switch discards frames attempting to perform MAC movement to ports which are in the lower priority learning class; and
    managing a priority for specific Source MAC addresses between a source port belonging to the higher priority learning class and the lower priority learning class based on detected loops for the specific Source MAC addresses,
    wherein the loops are detected based on MAC toggling of a Source MAC address where the Source MAC address has continuous movement across two or more ports of the switch over a detection window.

2. The loop prevention method of claim 1, wherein the managing comprises moving source ports of a specific source MAC address to the lower priority learning class responsive to detection of a loop, moving a trusted source port of the specific MAC address back to the higher priority learning class responsive to determination of direction of the loop, and moving the source ports which have incorrectly learnt specific source MAC address back to the higher priority learning class responsive to resolution of the loop.

3. The loop prevention method of claim 1, wherein the loop prevention method operates concurrently with a second loop prevention technique comprising one of G.8032, Spanning Tree Protocol (STP) variants, and split horizon.

4. The loop prevention method of claim 1, further comprising:
    responsive to detection of a loop, determining a direction of the loop based on which ports associated with the loop have MAC movement.

5. The loop prevention method of claim 1, further comprising:
    responsive to a loop including both User-Network Interface (UNI) ports and Network-Network Interface (NNI) ports at the switch, determining whether the loop is caused by a provider network or a customer network by transmitting Down Maintenance Entity Point (MEP) Continuity Check Messages (CCMs).

6. The loop prevention method of claim 5, further comprising:
    moving the UNI ports back to the higher priority learning class responsive to the loop being in the provider network; and
    moving the NNI ports back to the higher priority learning class responsive to the loop not being in the provider network.

7. The loop prevention method of claim 1, wherein the managing comprises monitoring count of discards due to MAC movements to monitor a status of the detected loops.

8. A loop prevention apparatus, in a switch, adapted to prevent loops in a packet switched network based on Media Access Control (MAC) movement in a forwarding database, the loop prevention apparatus comprising:
    circuitry adapted to enable class based MAC learning on one or more ports with all of the one or more ports initially in a higher priority learning class;
    circuitry adapted to disable MAC movements from ports belonging to the higher priority learning class to ports belonging to a lower priority learning class and disabling MAC movements in the lower priority learning class such that the switch discards frames attempting to perform MAC movement to ports which are in the lower priority learning class; and
    circuitry adapted to manage a priority for specific Source MAC addresses between a source port belonging to the higher priority learning class and the lower priority learning class based on detected loops for the specific Source MAC addresses,
    wherein the loops are detected based on MAC toggling of a Source MAC address where the Source MAC address has continuous movement across two or more ports of the switch over a detection window.

9. The loop prevention apparatus of claim 8, wherein the circuitry adapted to manage is adapted to move source ports of a specific source MAC address to the lower priority learning class responsive to detection of a loop, to move a trusted source port of the specific MAC address back to the higher priority learning class responsive to determination of direction of the loop, and to move the source ports which have incorrectly learnt specific source MAC address back to the back to the higher priority learning class responsive to resolution of the loop.

10. The loop prevention apparatus of claim 8, further comprising:
    circuitry adapted to operate a second loop prevention technique comprising one of G.8032, Spanning Tree Protocol (STP) variants, and split horizon concurrently with the loop prevention apparatus.

11. The loop prevention apparatus of claim 8, further comprising:
    circuitry adapted to determine a direction of the loop based on which ports associated with the loop have MAC movement responsive to detection of a loop.

12. The loop prevention apparatus of claim 8, further comprising:
    circuitry adapted to determine whether the loop is caused by a provider network or a customer network by transmitting Down Maintenance Entity Point (MEP) Continuity Check Messages (CCMs) responsive to a loop including both User-Network Interface (UNI) ports and Network-Network Interface (NNI) ports at the switch.

13. A switch adapted to prevent loops in a packet switched network based on Media Access Control (MAC) movement in a forwarding database, the switch comprising:
    a plurality of ports adapted for packet switching between one another; and
    a controller adapted to
        enable class based MAC learning on one or more ports with all of the one or more ports initially in a higher priority learning class,
        disable MAC movements from ports belonging to the higher priority learning class to ports belonging to a lower priority learning class and disabling MAC movements in the lower priority learning class such that the switch discards frames attempting to perform MAC movement to ports which are in the lower priority learning class, and manage a priority for specific Source MAC addresses between a source port belonging to the higher priority learning class and the lower priority learning class based on detected loops for the specific Source MAC addresses, wherein the controller is adapted to operate a second loop prevention technique comprising one of G.8032, Spanning Tree Protocol (STP) variants, and split horizon concurrently with the loop prevention apparatus.

14. The switch of claim 13, wherein the controller is adapted to move source ports of a specific source MAC address to the lower priority learning class responsive to detection of a loop, to move a trusted source port of the specific MAC address back to the higher priority learning class responsive to determination of direction of the loop, and to move the source ports which have incorrectly learnt specific source MAC address back to the higher.

15. The switch of claim 13, wherein the loops are detected based on MAC toggling of a Source MAC address where the Source MAC address has continuous movement across two or more ports of the switch over a detection window.

16. The switch of claim 13, wherein the controller is adapted to determine a direction of the loop based on which ports associated with the loop have MAC movement responsive to detection of a loop.

17. The switch of claim 13, wherein the controller is further adapted to determine whether the loop is caused by a provider network or a customer network by transmitting Down Maintenance Entity Point (MEP) Continuity Check Messages (CCMs) responsive to a loop including both User-Network Interface (UNI) ports and Network-Network Interface (NNI) ports at the switch.

\* \* \* \* \*